(12) United States Patent
Diersch (10) Patent No.: US 12,263,439 B2
(45) Date of Patent: Apr. 1, 2025

(54) FILTER BODY, FILTER ELEMENT, AND FILTER ASSEMBLY

(71) Applicant: MANN+HUMMEL GmbH, Ludwigsburg (DE)

(72) Inventor: Stefan Diersch, Trebgast (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 540 days.

(21) Appl. No.: 17/321,969

(22) Filed: May 17, 2021

(65) Prior Publication Data

US 2021/0268427 A1 Sep. 2, 2021

Related U.S. Application Data

(63) Continuation of application No. PCT/EP2019/077591, filed on Oct. 11, 2019.

(30) Foreign Application Priority Data

Nov. 19, 2018 (DE) ..................... 10 2018 128 963.4

(51) Int. Cl.
*B01D 53/04* (2006.01)
*B01D 53/30* (2006.01)
(Continued)

(52) U.S. Cl.
CPC ..... *B01D 53/0454* (2013.01); *B01D 53/0431* (2013.01); *B01D 53/30* (2013.01);
(Continued)

(58) Field of Classification Search
CPC ............ B01D 53/0454; B01D 53/0431; B01D 53/30; B01D 2253/102; B01D 2253/25;
(Continued)

(56) References Cited

U.S. PATENT DOCUMENTS 5,714,126 A * 2/1998 Frund ................ B01D 53/0415
55/482
6,299,771 B1 * 10/2001 Shmidt ..................... B01J 20/20
210/508
(Continued)

FOREIGN PATENT DOCUMENTS

CN 203469686 U 3/2014
CN 106000093 A * 10/2016 ......... B01D 53/8668
(Continued)

OTHER PUBLICATIONS

"Adsorption" Wikipedia published Dec. 12, 2013 <https://en.wikipedia.org/w/index.php?title=Adsorption&oldid=585720227#Adsorbents> (Year: 2013).*

*Primary Examiner* — Stephen Hobson (57) ABSTRACT

A filter body is provided with a filter medium that has filter layers arranged one over the other, wherein each filter layer is provided with at least one active material. The at least one active material is the same in all of the filter layers. The filter layers are to be flowed through serially in a through-flow direction of the filter body. Sensor devices are provided, wherein each sensor device is arranged between two of the filter layers neighboring each other, respectively, so that the sensor devices, in the through-flow direction of the filter body, are arranged one after another in order to determine a sorption capacity of the at least one active material of each filter layer over a service life of the filter body.

10 Claims, 6 Drawing Sheets

(51) Int. Cl.
  *B32B 1/08* (2006.01)
  *B32B 5/26* (2006.01)
  *B32B 29/00* (2006.01)
  *H01M 8/04089* (2016.01)

(52) U.S. Cl.
  CPC ............... *B32B 1/08* (2013.01); *B32B 5/26* (2013.01); *B32B 29/005* (2013.01); *H01M 8/04089* (2013.01); *B01D 2253/102* (2013.01); *B01D 2253/25* (2013.01); *B01D 2257/302* (2013.01); *B01D 2257/304* (2013.01); *B01D 2257/404* (2013.01); *B01D 2257/406* (2013.01); *B01D 2257/708* (2013.01); *B32B 2597/00* (2013.01)

(58) Field of Classification Search
  CPC ........ B01D 2257/302; B01D 2257/304; B01D 2257/404; B01D 2257/406; B01D 2257/708; B01D 46/2403; B01D 2258/06; B01D 46/0036; B01D 46/0086; B01D 46/442; B01D 46/528; B01D 2275/10; B01D 2275/105; B01D 46/10; B32B 1/08; B32B 5/26; B32B 29/005; B32B 2597/00; H01M 8/04089; Y02E 60/50
  See application file for complete search history.

(56) References Cited

U.S. PATENT DOCUMENTS

| | | | | |
|---|---|---|---|---|
| 6,634,210 B1 * | 10/2003 | Bosch | ................ | G01N 15/0656 204/426 |
| 7,416,580 B2 * | 8/2008 | Nyman | ................ | B01D 46/525 96/380 |
| 7,442,237 B1 * | 10/2008 | Gardner | ................ | A62B 23/02 55/DIG. 35 |
| 9,776,121 B2 * | 10/2017 | Volk | ................ | B01D 46/528 |
| 10,363,502 B2 * | 7/2019 | Bonifas | ................ | B01D 46/429 |
| 11,757,107 B2 * | 9/2023 | Bone | ................ | H01M 8/1286 429/457 |
| 2002/0011568 A1 * | 1/2002 | Diekmann | ................ | G01J 5/34 250/338.3 |
| 2002/0178923 A1 * | 12/2002 | Kishovich | ........... | B01D 53/0407 96/135 |
| 2003/0113943 A1 * | 6/2003 | Kishkovich | ....... | H01L 21/67253 438/14 |
| 2005/0051030 A1 * | 3/2005 | Kishkovich | ............. | B01J 20/20 96/413 |
| 2006/0243134 A1 * | 11/2006 | von Blucher | ........ | B01J 20/3234 95/90 |
| 2007/0065951 A1 * | 3/2007 | Soldatov | ................ | B01D 53/34 436/174 |
| 2008/0006153 A1 * | 1/2008 | Friday | .................... | B01D 53/02 95/135 |
| 2008/0078289 A1 * | 4/2008 | Sergi | .................... | B01D 46/429 55/467 |
| 2009/0010801 A1 * | 1/2009 | Murphy | ................. | B01D 46/10 422/4 |
| 2009/0249954 A1 * | 10/2009 | Gadkaree | ............... | B01D 53/64 95/134 |
| 2010/0153023 A1 * | 6/2010 | Parham | .............. | B01D 53/0415 702/34 |
| 2011/0036145 A1 * | 2/2011 | Dobbyn | ................ | B08B 15/023 96/152 |
| 2011/0303086 A1 * | 12/2011 | Fujii | ......................... | B03C 3/12 95/287 |
| 2012/0118160 A1 * | 5/2012 | Heffes | ....................... | B01J 20/08 264/176.1 |
| 2014/0272612 A1 * | 9/2014 | Trevisan | ............ | H01M 8/04014 429/408 |
| 2014/0326134 A1 * | 11/2014 | Frankel | .............. | B01D 53/0407 95/25 |
| 2016/0030877 A1 * | 2/2016 | Frankel | .............. | B01D 53/0415 95/25 |
| 2016/0129383 A1 * | 5/2016 | Volk | .................. | F02M 35/02483 96/135 |
| 2016/0256851 A1 * | 9/2016 | Glover | ............... | G01N 33/5438 |
| 2016/0297285 A1 * | 10/2016 | Luley | ..................... | B01D 46/10 |
| 2017/0095771 A1 * | 4/2017 | Venet | .................... | B01D 53/346 |
| 2017/0217763 A1 * | 8/2017 | Caesar | .................. | B81B 7/0061 |
| 2018/0089547 A1 * | 3/2018 | Bonifas | ................ | G01D 5/142 |
| 2018/0154193 A1 * | 6/2018 | Stinzendoerfer | .. | B01D 53/0415 |
| 2018/0169559 A1 * | 6/2018 | Kloss | .................... | B01D 46/522 |
| 2018/0221795 A1 * | 8/2018 | Bonifas | ................ | B01D 46/429 |

FOREIGN PATENT DOCUMENTS

| | | | | |
|---|---|---|---|---|
| CN | 107042041 A | * | 8/2017 | |
| CN | 206965370 U | | 2/2018 | |
| CN | 107899358 A | | 4/2018 | |
| CN | 207300177 U | * | 5/2018 | |
| DE | 102005001756 A1 | | 7/2006 | |
| DE | 102014016168 A1 | * | 5/2015 | ......... B01D 46/0006 |
| DE | 102016009603 A1 | * | 8/2017 | |
| DE | 102020113615 A1 | * | 11/2020 | ......... B01D 46/0016 |
| EP | 2868362 B1 | | 1/2018 | ......... B01D 46/0006 |
| JP | H04200719 A | | 7/1992 | |
| JP | 2004200402 A | | 7/2004 | |
| KR | 1020120016525 A | | 2/2012 | |
| WO | WO-2006128453 A1 | * | 12/2006 | ........... B01D 46/002 |
| WO | WO-2008145988 A1 | * | 12/2008 | ........ B01D 53/0454 |
| WO | WO-2012048980 A1 | * | 4/2012 | ............. B01D 46/00 |

\* cited by examiner

FILTER BODY, FILTER ELEMENT, AND FILTER ASSEMBLY

CROSS-REFERENCE TO RELATED APPLICATIONS

This application is a continuation application of international application No. PCT/EP2019/077591 having an international filing date of 11 Oct. 2019 and designating the United States, the international application claiming a priority date of 19 Nov. 2018 based on prior filed German patent application No. 10 2018 128 963.4, the entire contents of the aforesaid international application and the aforesaid German patent application being incorporated herein by reference.

BACKGROUND OF THE INVENTION

The present invention concerns a filter body for a filter element, a filter element with such a filter body, and a filter assembly with such a filter element.

Fuel cell filters or pesticide filters often require a precise prediction of their service life. However, this can be indicated only with too high a safety margin for most applications because of the ambient conditions that differ greatly from user to user. However, since such fuel cell filters or pesticide filters are often expensive, it is desirable to realize a service interval that is a long as possible.

KR 2012 0016525 A concerns a filter configuration for an air purifier. The latter comprises various filter stages that are to be flowed through serially, namely an active carbon filter stage, an odor filter stage, a particle filter stage, an antibacterial filter stage, and a HEPA stage. Sensors that are intended to signal an exchange of the respective filter layer are associated with the odor filter and the antibacterial filter, respectively.

The sensors that are associated with the filter layers are thus arranged in through-flow direction one after another but, since the respective filter stages differ in type, no gradual "consumption" of a sorption capacity can be determined; instead, only a binary value for a breakthrough of the respective filter stage is determined thereat.

SUMMARY OF THE INVENTION

Based on this background, it is the object of the present invention to provide an improved filter body for a filter element.

Accordingly, a filter body for a filter element is proposed. The filter body comprises a filter medium that comprises a plurality of filter layers arranged one above the other and a plurality of sensor devices, wherein between two neighboring filter layers a sensor device is arranged, respectively, so that the sensor devices in a through-flow direction of the filter body are arranged one after another in order to determine a sorption capacity of the active material of the individual filter layers over a service life of the filter body. The filter layers comprise each at least one active material, wherein the at least one active material is the same in all filter layers. The filter layers in which the sensor devices are provided can be flowed through serially. Preferably, the active material comprises at least one sorbent or sorption material that is the same in all filter layers.

In the meaning of the invention, "neighboring" not only designates filter layers that immediately adjoin each other but also filter layers that indirectly adjoin each other, i.e., such filter layers between which one or a plurality of additional, in particular sensor-free, filter layers are located. The gist of the invention resides in being able to determine the consumption of the sorption capacity of the filter layers not only "binary" for the entire filter body but with a predetermined number of intermediate values which is enabled by arrangement of sensor devices in a plurality of the filter layers.

In order to obtain a measuring precision as good as possible, it is preferred that a sensor device is provided between each of the neighboring filter layers.

The filter element is preferably an air filter element. In particular, the filter element is a fuel cell filter or a pesticide filter. Preferably, the filter element is used in motor vehicles, trucks, construction vehicles, watercraft, rail vehicles, agricultural machines or vehicles, or aircraft. The filter element can also be used in immobile applications, for example, in building technology.

The filter medium is in particular a filter paper, a filter fabric, a laid filter material or a filter nonwoven. In particular, the filter medium can be produced by a spunbonding or meltblowing method or can comprise such a fiber layer applied onto a nonwoven or cellulose support. Moreover, the filter medium can be felted or needled. The filter medium can comprise natural fibers, such as cellulose or cotton, or synthetic fibers, for example, of polyester, polyvinyl sulfide or polytetrafluoroethylene. The filter medium is preferably not folded but flat.

The filter medium or the individual filter layers comprise preferably a sorption agent or a plurality of different sorption agents. Herein, "sorption" is to be understood as processes that lead to accumulation of a substance within a phase or at a boundary surface between two phases. The accumulation within a phase is more precisely referred to as absorption, the accumulation at the boundary surface is referred to as adsorption. The sorption agent can also be referred to as sorbent. A system of an adsorbed or absorbed, i.e., sorbed, material with the sorption agent can be referred to as sorbate.

The number of filter layers and the number of sensor devices is arbitrary, respectively. For example, a first filter layer, a second filter layer, a third filter layer, a fourth filter layer, and a fifth filter layer are provided. In this context, a sensor device is positioned between the first filter layer and the second filter layer, a sensor device between the second filter layer and the third filter layer, a sensor device between the third filter layer and the fourth filter layer, a sensor device between the fourth filter layer and the fifth filter layer, respectively. The "through-flow direction" is defined as a flow direction of a fluid, in particular air, flowing through the filter body. The through-flow direction is oriented from the raw side of the filter body to the clean side thereof.

The fluid to be filtered or purified is preferably air. The fluid to be filtered comprises substances to be removed from the fluid. These substances can be, for example, gas and/or odor substances. For example, the substances can be n-butane, volatile organic compounds (VOC), nitrogen oxides ($NO_x$), sulfur dioxide ($SO_2$), hydrogen sulfide ($H_2S$), ammonia ($NH_3$) and/or formaldehyde ($CH_2O$). The sorption agent or the sorption agents in the different filter layers are now suitable to remove these substances that are to be removed from the fluid to be filtered.

Viewed in the through-flow direction, the filter layers are arranged one over the other. The sensor devices, viewed in the through-flow direction, are arranged in particular in series or in a row. In particular, the sensor devices can also be arranged, respectively, immediately in the filter layer associated therewith. Herein, "sorption capacity" of the respective filter layer is to be understood as the suitability of the respective filter layer to remove the substances, that are contained in the fluid and to be removed therefrom, by sorption from the fluid. By means of the sensor devices, it can be detected whether the respective filter layer is still capable of removing the substances to be removed from the fluid or whether the substances to be removed break through the respective filter layer. By means of the sensor devices, it can thus be determined for each filter layer whether the latter still removes the substances to be removed from the fluid or not. In particular, the filter layers comprise a sorption capacity of 100% prior to operation of the filter body. As soon as the substances to be removed break through the respective filter layer, the latter has a sorption capacity of 0%.

Since a plurality of sensor devices are provided and since they are positioned between the filter layers, it is possible to indicate a residual service life of the filter body with a high precision. An exchange of the filter body is required only at the time when a sensor device that is located closest to the clean side of the filter body emits a signal that the filter layer associated with it no longer can absorb or sorb the substances to be removed from the fluid.

In embodiments, the filter medium is divided into a plurality of individual filter layers that are stacked on top of each other or the filter medium is coiled. In the first mentioned case, the filter body is a stacked body. In the second mentioned case, the filter body is a coil body. In case the filter medium is divided into a plurality of individual filter layers, the filter medium is of a multi-part configuration. The individual filter layers are stacked on top of each other. In case the filter medium is coiled, it can be coiled, for example, onto a support tube or a central tube of the filter medium in a spiral shape.

In embodiments, the active material of the filter layers comprises active carbon, in particular untreated active carbon, catalytic active carbon or impregnated active carbon, an ion exchanger, adsorbents, in particular potassium permanganate, chemical sorbents, a drying agent and/or oxidation agent. The individual filter layers in this context are all identically provided with at least one of the aforementioned substances or individual filter layers are provided with different substances. The substances can be glued to the filter medium, for example.

In embodiments, the sensor devices comprise optoelectronic sensors, electrochemical sensors and/or gas sensors. By means of an optoelectronic sensor, for example, by means of a photodiode or photocell, color changes of the filter layers can be detected. A color change can happen when the substances to be removed break through the respective filter layer. For producing a color change, a coloring agent can be provided. By means of an electrochemical sensor or a gas sensor, the substances to be removed from the fluid can be directly detected upon breakthrough through the respective filter layer. The sensor devices form together a sensor unit of the filter body.

In embodiments, each sensor device is designed to provide a binary information whether the filter layer associated with the respective sensor device removes the substances to be removed from the fluid to be purified or whether these substances break through the filter layer. The binary information lies in providing evidence whether the respective filter layer still removes the substances to be removed from the fluid or does so no longer.

In embodiments, the filter body comprises moreover a contact element attached to the filter body which is in operative connection with the sensor devices. The contact element can be, for example, a plug or a bushing. The contact element can be in operative connection with the sensor devices, for example, by means of electrical conduits. However, the operative connection can also be a wireless connection between the sensor devices and the contact element. The contact element is in particular suitable to engage a corresponding interface of a filter receptacle of the filter element. The interface can be, for example, also a plug or a bushing.

Moreover, a filter element, in particular a fuel cell filter or a pesticide filter, with such a filter body is proposed. In addition to the filter body, the filter element can comprise, for example, two end disks between which the filter body is arranged. Moreover, the filter element can comprise a central tube or support tube onto which the filter medium is coiled for forming the filter body. In case that the filter element is a stacked filter, the filter element can comprise, in addition to the plate-shaped filter body, head bands or lateral bands that surround the filter body like a frame.

Moreover, a filter assembly with a filter receptacle and with such a filter element received in the filter receptacle is proposed. The filter receptacle is preferably of a multi-part configuration and comprises at least a cover that can be removed in order to exchange the filter element. The filter receptacle can also be referred to, for example, as housing or filter housing.

In embodiments, the filter receptacle comprises an interface by means of which sensor signals of the sensor device can be read out. The interface, as mentioned before, can be a plug or a bushing into which the contact element of the filter body can be inserted. The interface can however also be directly in operative connection with the sensor devices. For example, the interface is connected by cables to the sensor devices. Alternatively, a wireless connection between the interface and the sensor devices for reading out the sensor signals can be provided also.

In embodiments, the sensor devices are attached to the filter receptacle so that the sensor devices upon introduction of the filter element into the filter receptacle penetrate into the filter body and upon removal of the filter element from the filter receptacle can be pulled out of the filter body. In this case, the sensor devices are not correlated with the filter body but with the filter receptacle. The sensor devices can be attached to rod-shaped or lance-shaped elements that upon insertion of the filter element into the filter receptacle penetrate into the filter body. Alternatively, the sensor devices, as mentioned before, can also be associated with the filter body and, for example, can be glued thereto. In this case, the sensor devices are not connected fixedly to the filter receptacle.

DESCRIPTION OF PREFERRED EMBODIMENTS

Figure 1:
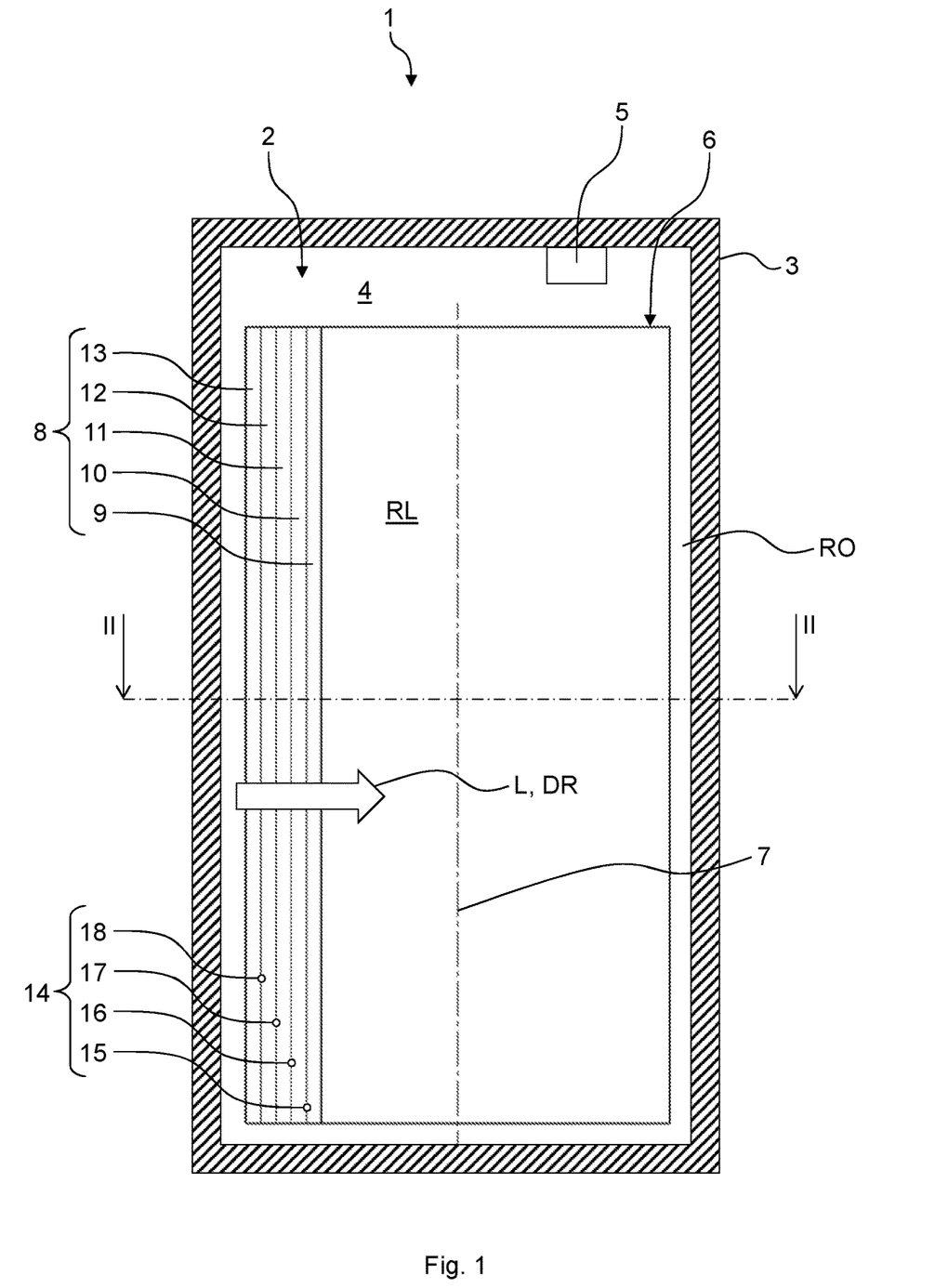
FIG. 1 shows a schematic section view of an embodiment of a filter assembly.
Figure 2:
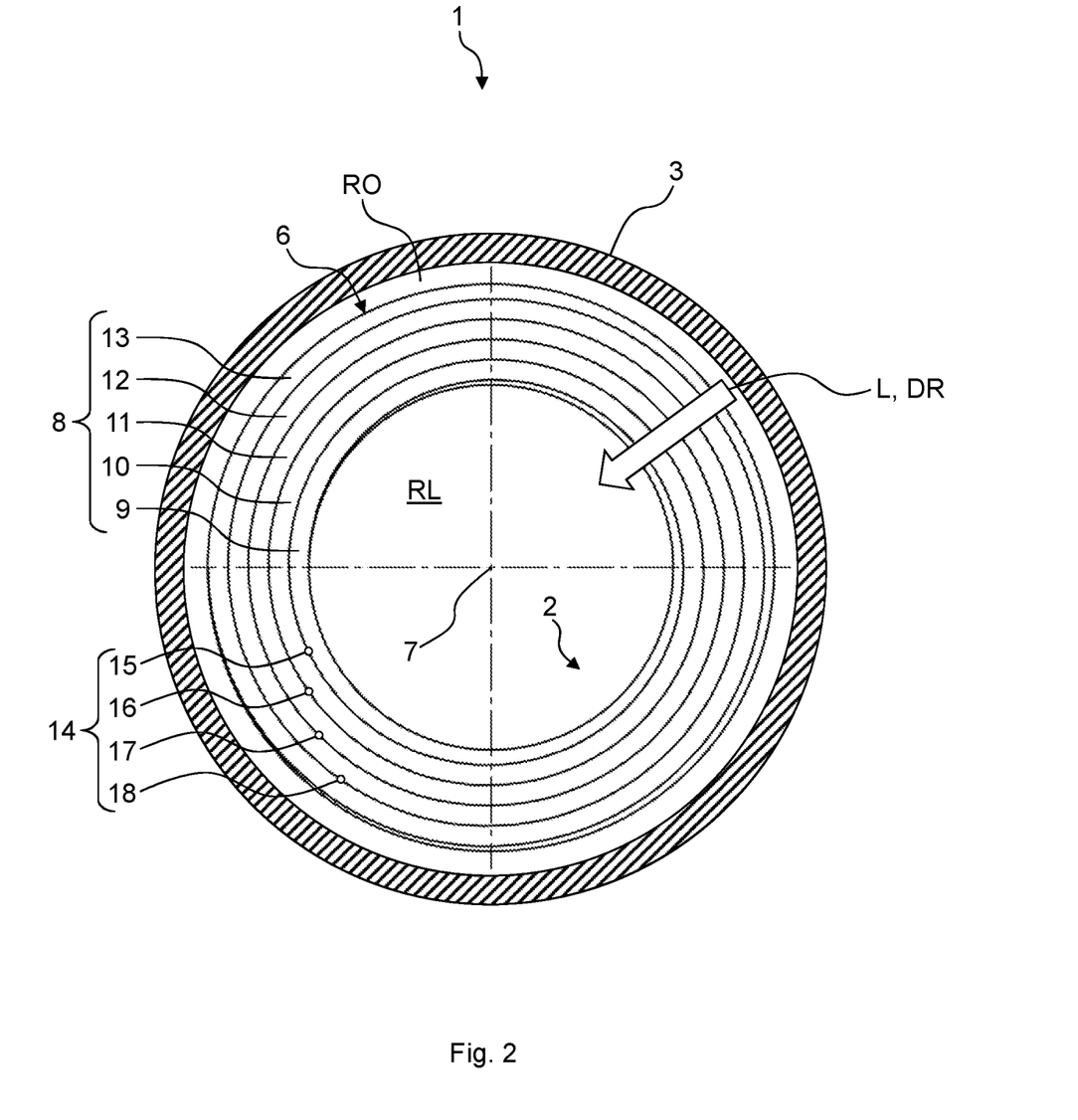
FIG. 2 shows a further schematic section view of the filter assembly according to section line II-II of FIG. 1.
Figure 3:
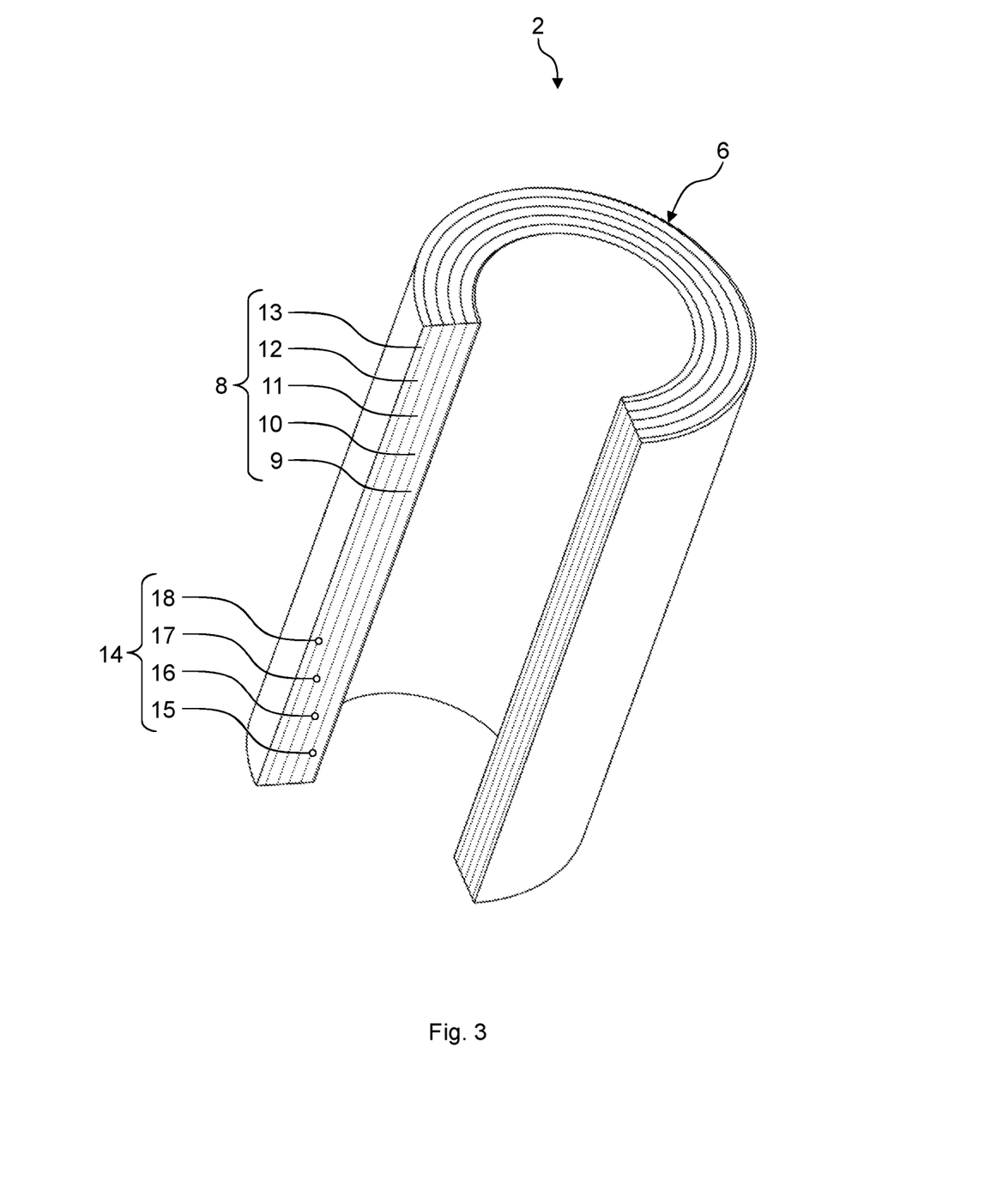
FIG. 3 shows a schematic perspective partial section view of an embodiment of a filter element for the filter assembly according to FIG. 1.
Figure 4:
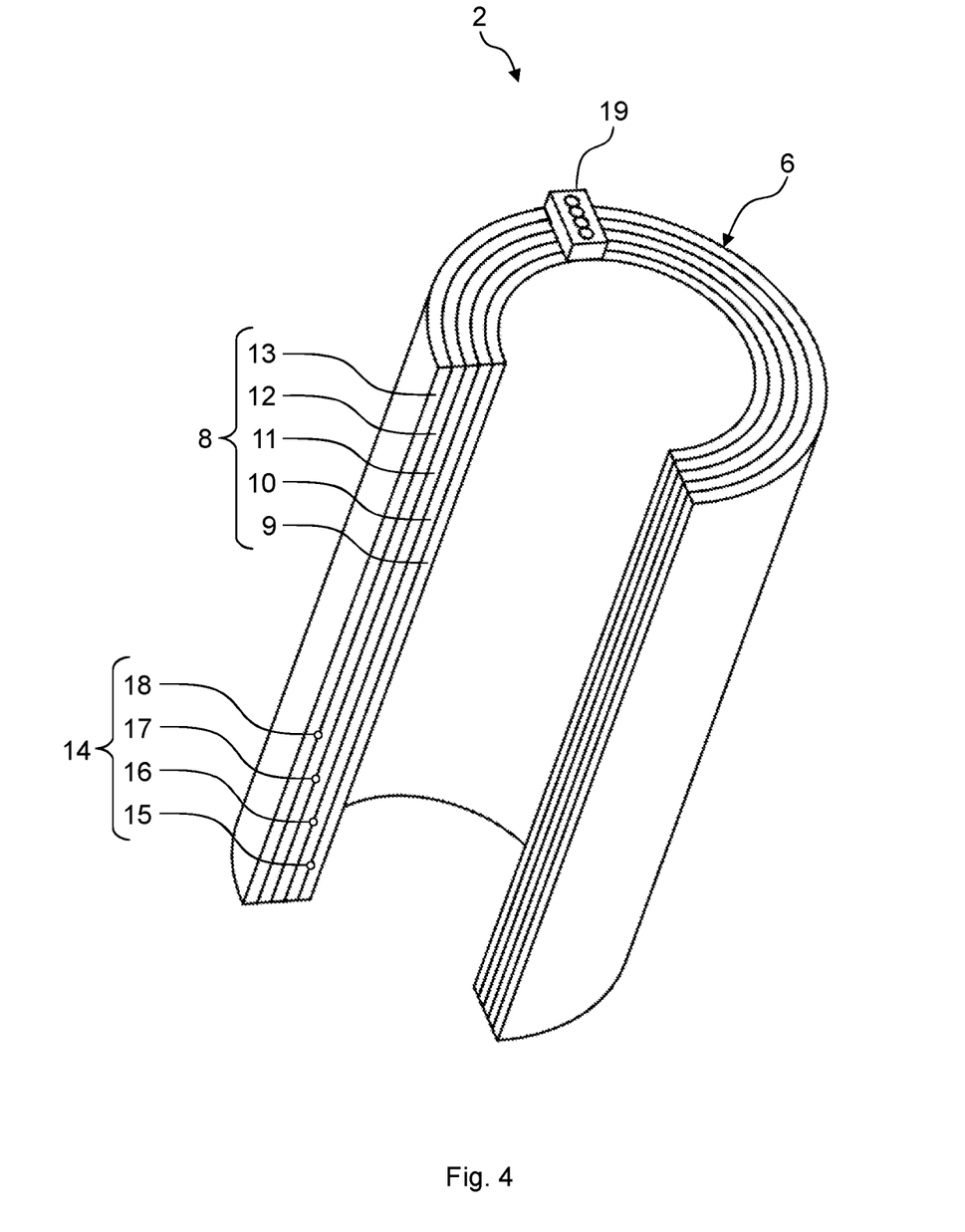
FIG. 4 shows a further schematic perspective partial section view of the filter element according to FIG. 3.

FIG. 1 shows a schematic section view of an embodiment of a filter assembly 1. FIG. 2 shows a further section view of the filter assembly 1 according to the section line II-II of FIG. 1. FIG. 3 shows a schematic perspective partial section view of an embodiment of a filter element 2 for the filter assembly 1 according to FIG. 1. FIG. 4 shows a further schematic perspective partial section view of the filter element 2. In the following, reference is being had simultaneously to FIGS. 1 to 4.

The filter assembly 1 can also be referred to as filter system. The filter assembly 1 comprises a filter receptacle 3 and the filter element 2 that is arranged in the filter receptacle 3. The filter receptacle 3 can also be referred to as housing or filter housing. The filter receptacle 3 is preferably of a multi-part configuration and comprises at least one removable cover so that the filter element 2 can be exchanged.

The filter assembly 1 finds preferably use as fuel cell filter assembly or as pesticide filter assembly. For example, the filter assembly 1 can be used in motor vehicles, trucks, construction vehicles, watercraft, rail vehicles, agricultural machines or vehicles, or aircraft. The filter assembly 1 can also be used in immobile applications, for example, in building technology. The filter element 2 is in particular suitable to filter air. In particular, the filter element 2 can be a fuel cell filter or a pesticide filter.

Inside the filter receptacle 3, i.e., in an interior 4 of the filter receptacle 3, the filter element 2 is arranged. In the interior 4, there is also an interface 5 provided whose function will still be explained in the following. The filter element 2 comprises a filter body 6. The filter body 6 is cylinder-shaped, in particular circular cylinder-shaped, and can be constructed with rotational symmetry in relation to a central or symmetry axis 7.

In addition to the filter body 6, the filter element 2 can comprise two end disks arranged at end faces at the filter body 6 which however are not illustrated in FIGS. 1 to 4. The end disks are preferably manufactured of a plastic material. For example, the end disks can be embodied as inexpensive injection molded plastic components. The end disks can also be manufactured of a polyurethane material which is in particular cast in casting molds, preferably foamed. The end disks can be connected by casting to the filter body 6. The filter body 6 is arranged between the end disks and can be fused, glued or welded thereto. A support tube or central tube can be received inside the filter body 6. The filter body 6 can be coiled onto this support tube or central tube.

The filter body 6 comprises a filter medium 8. The filter medium 8 is coiled as a coil onto the aforementioned central tube and forms thus a plurality of filter layers 9 to 13 one over the other. The filter medium 8 is, for example, a filter paper, a filter fabric, a laid filter material or a filter nonwoven. In particular, the filter medium 8 can be produced by a spunbonding or meltblowing method or can comprise such a fiber layer applied onto a nonwoven or cellulose support. Moreover, the filter medium 8 can be felted or needled. The filter medium 8 can comprise natural fibers, such as cellulose or cotton, or synthetic fibers, for example, of polyester, polyvinyl sulfide or polytetrafluoroethylene. Fibers of the filter medium 8 can be oriented during processing in, at a slant to, and/or transversely to, or randomly in relation to a machine direction.

The respective filter layers 9 to 13 comprise an active material, in particular sorption material. Herein, "sorption" is to be understood as a collective term for processes that lead to an accumulation of a substance within a phase or at a boundary surface between two phases. The accumulation within a phase is referred to more precisely as absorption, and the accumulation at the boundary surface as adsorption. In particular, the filter layers 9 to 13 each comprise active carbon, in particular untreated active carbon, catalytic active carbon or impregnated active carbon, an ion exchanger, drying agent, adsorbents, in particular potassium permanganate, chemical sorbents and/or oxidation agents.

In particular, the filter layers 9 to 13 each can also comprise a coloring agent that is suitable to generate a color change when the sorption capacity of the respective filter layer 9 to 13 is depleted. Herein, "sorption capacity" is to be understood as the property of the respective filter layer 9 to 13 to filter substances to be removed, for example, gas and/or odor substances, in particular n-butane, volatile organic compounds (VOC), nitrogen oxides ($NO_x$), sulfur dioxide ($SO_2$), hydrogen sulfide ($H_2S$), ammonia ($NH_3$) or formaldehyde ($CH_2O$), from a fluid L to be purified, in particular air. The respective filter layer 9 to 13 comprises a sorption capacity of 100% prior to use. As soon as the substances to be removed from the fluid L break through the respective filter layer 9 to 13, the latter comprises a sorption capacity of 0%.

In operation of the filter assembly 1, the fluid L to be purified passes from a raw side RO of the filter element 2 through the coiled filter medium 8 to a clean side RL of the filter element 2. The filter body 6 comprises in this context a through-flow direction DR oriented from the raw side RO to the clean side RL. In the through-flow direction DR, the filter layers 9 to 13 are positioned on top of each other.

The body 6 comprises moreover a sensor unit 14 that is suitable to determine the sorption capacity of the filter layers 9 to 13. The sensor unit 14 comprises a plurality of sensor devices 15 to 18 that are arranged between two neighboring filter layers 9 to 13, respectively. A first sensor device 15 is arranged between the filter layers 9, 10, a second sensor device 16 between the filter layers 10, 11, a third sensor device 17 between the filter layers 11, 12, and a fourth sensor device 18 between the filter layers 12, 13. The sensor devices 15 to 18 can be connected fixedly to the filter body 6. For example, the sensor devices 15 to 18 are glued to the filter body 6. For example, the sensor devices 15 to 18 can be introduced between the filter layers 9 to 13 upon coiling the filter medium 8.

Alternatively, the sensor unit 14 can also be correlated with the filter receptacle 3 so that the sensor devices 15 to 18 are mounted at the filter receptacle 3. In this case, the sensor devices 15 to 18 penetrate into the filter body 6 when introducing the filter element 2 into the filter receptacle 3. Accordingly, the sensor devices 15 to 18 are again pulled from the filter body 6 upon removal of the filter element 2 from the receptacle 3. In this way, the sensor unit 14 upon exchange of the filter element 2 can be reused any number of times. The sensor devices 15 to 18 comprise, for example, optoelectronic sensors, electrochemical sensors, and/or gas sensors. For example, an optoelectronic sensor in the form of a photocell can detect a color change of the respective filter layer 9 to 13.

The sensor devices 15 to 18, viewed in the through-flow direction DR, are arranged one after another or in series.

Thus, the sorption capacity of the filter layers 9 to 13 can be determined over a service life of the filter body 6 in a stepped manner. In operation of the filter assembly 1, the fluid L to be purified flows through the filter body 6 in the through-flow direction DR. Accordingly, first the outermost filter layer 13 will lose its sorption capacity. Accordingly, as soon as the substances to be removed from the fluid L break through the filter layer 13, the sensor device 18 emits a corresponding signal. The filter element 2 can however be used until the sensor device 15 which is closest to the clean side RL emits a corresponding signal. As soon as the sensor device 15 emits the signal that the filter layer 10 comprises no sufficient sorption capacity anymore, the filter element 2 must be exchanged. In particular, each sensor device 15 to 18 is suitable to provide a binary information whether the filter layer 9 to 13 associated with the respective sensor device 15 to 18 removes the substances to be removed from the fluid L to be filtered or whether these substances break through the respective filter layer 9 to 13.

The sensor devices 15 to 18 can be arranged so as to be displaced relative to each other viewed along the symmetry axis 7, as illustrated in FIG. 1. Alternatively, the sensor devices 15 to 18, viewed in the through-flow direction DR, can also be arranged immediately one after another.

As shown in FIG. 4, the filter body 6 moreover can comprise a contact element 19 that is in operative connection with the sensor devices 15 to 18. The contact element 19 can be connected, for example, by means of cables or conductive paths arranged between the filter layers 9 to 13 to the sensor devices 15 to 18. Alternatively, the signal transmission from the sensor devices 15 to 18 to the contact element 19 can also be realized wireless. The contact element 19 is suitable to interact with the interface 5 of the filter receptacle 3. For example, the contact element 19 can be a plug that is suitable to engage the interface 5 embodied as counter plug or bushing.

Figure 5:
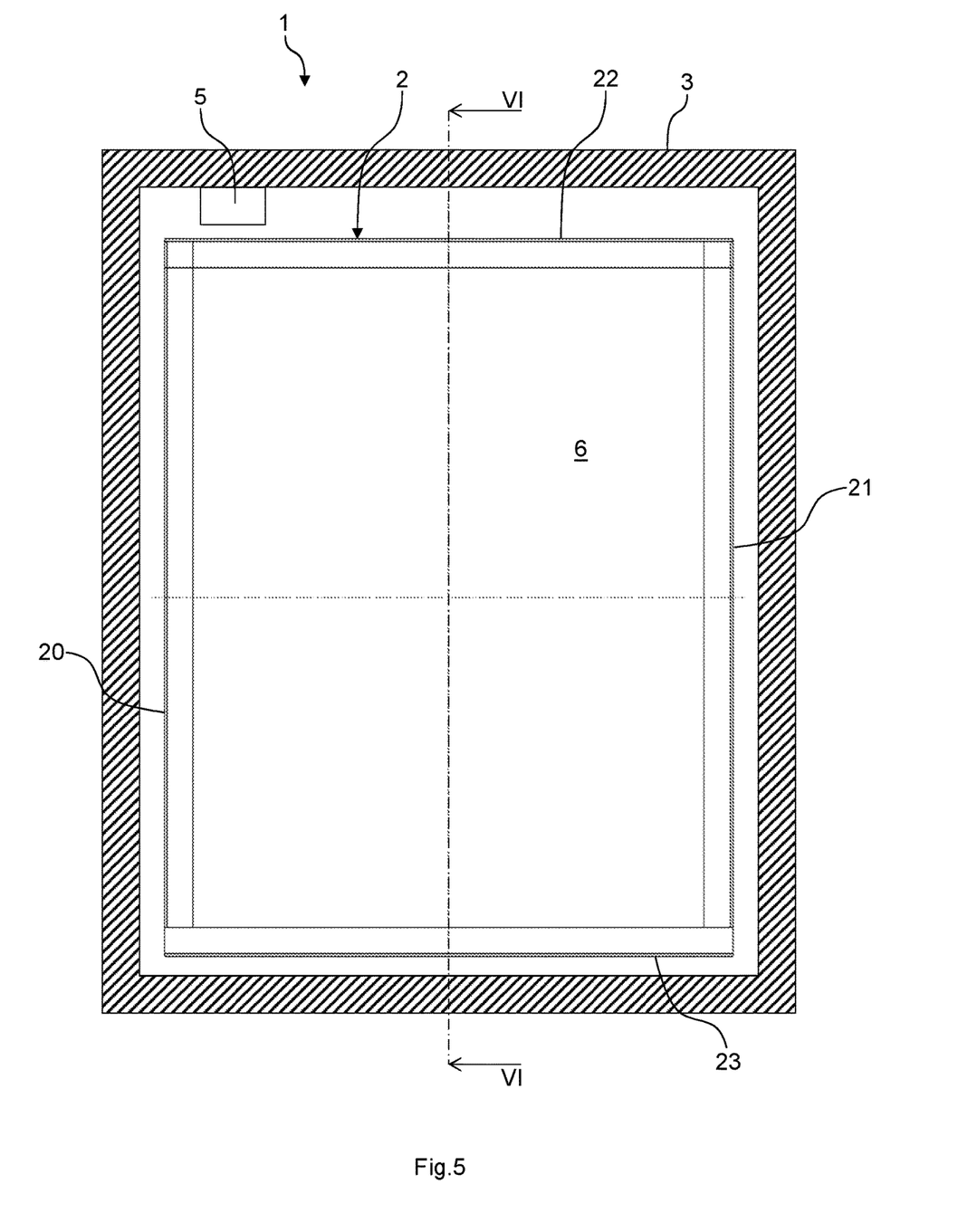
FIG. 5 shows a schematic section view of a further embodiment of a filter assembly.
Figure 6:
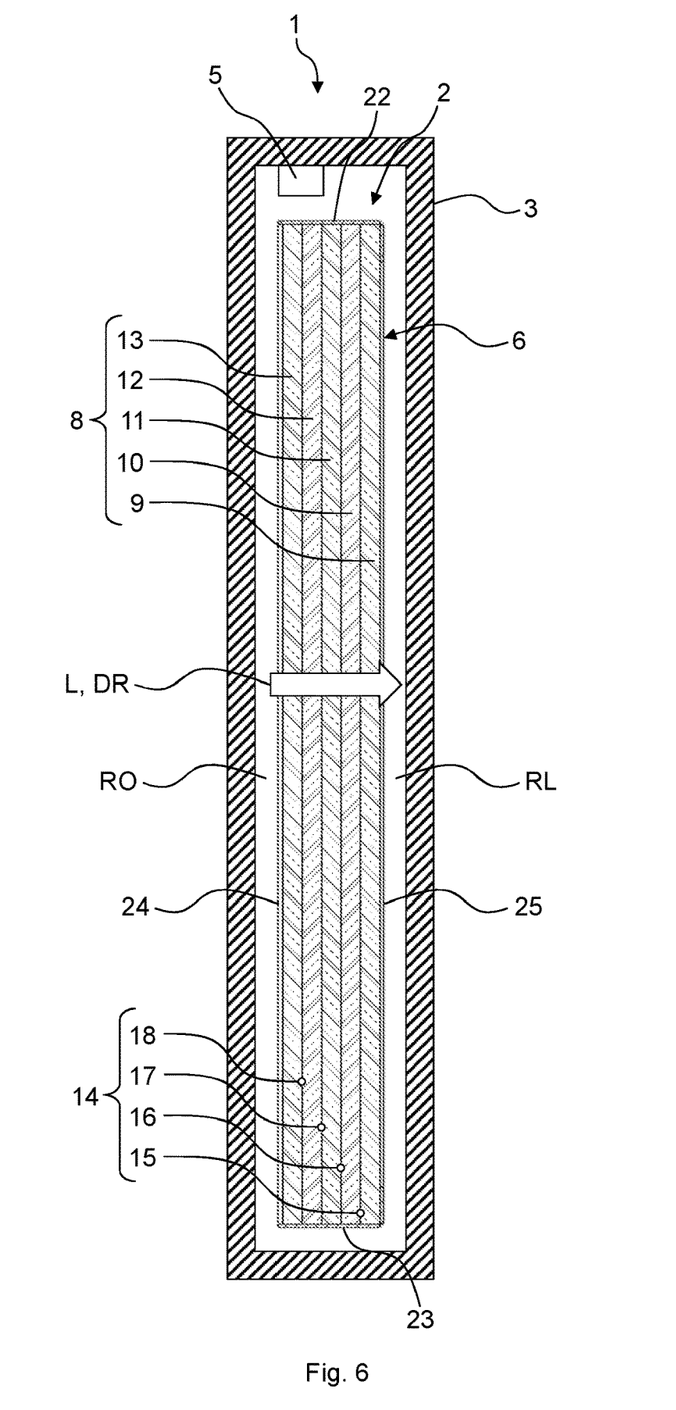
FIG. 6 a further schematic section view of the filter assembly according to the section line VI-VI of FIG. 5.

FIG. 5 shows a schematic section view of a further embodiment of a filter element 2. FIG. 6 shows a further schematic section of the filter element 2 according to the section line VI-VI according to FIG. 5. The filter element 2 according to FIGS. 5 and 6 differs from the filter element 2 according to FIGS. 1 to 4 substantially in that the filter medium 8 is not coiled but divided into a plurality of independent filter layers 9 to 13 that are separate from each other and are stacked on top of each other.

The function of the filter element 2 according to FIGS. 5 and 6 corresponds in this context to the function of the filter element 2 according to FIGS. 1 through 4. As shown in FIGS. 5 and 6, the filter element 2 comprises in addition to the filter body 6 lateral bands 20, 21 as well as head bands 22, 23 that surround the filter body 6 like a frame. A final layer 24, 25 can also be placed on the outwardly positioned filter layers 9, 13, respectively. The final layer 24, 25 can be, for example, a nonwoven filter layer.

In particular in fuel cell filters or pesticides filters, a precise prognosis in regard to service life is required. However, due to the ambient conditions which differ greatly from user to user, this can be done for most applications only with too high a safety margin. Since such fuel cell filters or pesticide filters are often expensive, it is desired to provide service intervals as long as possible. By means of the sensor devices 15 to 18 received in the filter body 6, a precise prediction of the service life of the filter element 2 is possible. An exchange of the filter element 2 is required only at the time when the sorption capacity of the filter body 6 is almost exploited.

EMPLOYED REFERENCE CHARACTERS 1 filter assembly
2 filter element
3 filter receptacle
4 interior
5 interface
6 filter body
7 symmetry axis
8 filter medium
9 filter layer
10 filter layer
11 filter layer
12 filter layer
13 filter layer
14 sensor unit
15 sensor device
16 sensor device
17 sensor device
18 sensor device
19 contact element
20 lateral band
21 lateral band
22 head band
23 head band
24 layer
25 layer
DR through-flow direction
L fluid
RL clean side
RO raw side

What is claimed is:

1. A filter assembly comprising:
a filter receptacle;
a filter element received in the filter receptacle, wherein the filter element comprises
a filter body, wherein the filter body comprises:
a filter medium comprising filter layers arranged one over the other,
wherein the filter layers each comprise at least one active material,
wherein the at least one active material is the same in all of the filter layers,
wherein the filter layers are configured to be flowed through serially in a through-flow direction of the filter body;
sensor devices, each sensor device arranged between two of the filter layers neighboring each other, respectively, so that the sensor devices, in the through-flow direction of the filter body, are arranged one after another in order to determine a sorption capacity of the at least one active material of each filter layer over a service life of the filter body,
wherein the sensor devices are attached to the filter receptacle,
wherein the sensor devices are configured to penetrate into the filter body upon introduction of the filter element into the filter receptacle and are configured to be pulled out of the filter body upon removal of the filter element from the filter receptacle.

2. The filter assembly according to claim 1, wherein the filter layers of the filter body are individual filter layers of the filter medium and the individual filter layers of the filter medium are stacked on top of each other.

3. The filter assembly according to claim 1, wherein the filter medium of the filter body is coiled to form the filter layers arranged one over the other.

4. The filter assembly according to claim 1, wherein the active material is untreated active carbon, catalytic active carbon or impregnated active carbon.

5. The filter assembly according to claim 1, wherein the sensor devices comprise at least one of:
electrochemical sensors, and/or
gas sensors.

6. The filter assembly according to claim 1, wherein each sensor device is configured to emit a binary information indicating whether an upstream layer of the two of the filter layers neighboring each other removes unwanted substances to be removed from a fluid to be purified by the filter body or whether the unwanted substances to be removed break through the upstream layer.

7. The filter assembly according to claim 1, wherein the filter element is a fuel cell filter or a pesticide filter.

8. The filter assembly according to claim 1, wherein the filter receptacle comprises
an interface configured to read out sensor signals of the sensor devices.

9. The filter assembly according to claim 8, wherein the interface is arranged on the filter receptacle in operative electrical connection with a contact element attached onto the filter body of the filter element.

10. The filter assembly according to claim 9, wherein one of the contact element and the interface is a plug and the other of the contact element and the interface is a counter plug.

* * * * *